United States Patent
Binal et al.

(10) Patent No.: US 11,579,846 B2
(45) Date of Patent: Feb. 14, 2023

(54) ROLLING SECURITY CODE FOR A NETWORK CONNECTED SOUNDBAR DEVICE

(71) Applicant: Crestron Electronics, Inc., Rockleigh, NJ (US)

(72) Inventors: Ekin Binal, Rockleigh, NJ (US); Joseph Sarrasin, Rockleigh, NJ (US); Mark Hrozenchik, Rockleigh, NJ (US)

(73) Assignee: Crestron Electronics, Inc.

( * ) Notice: Subject to any disclaimer, the term of this patent is extended or adjusted under 35 U.S.C. 154(b) by 597 days.

(21) Appl. No.: 16/690,339

(22) Filed: Nov. 21, 2019

(65) Prior Publication Data
US 2020/0174753 A1    Jun. 4, 2020

Related U.S. Application Data

(60) Provisional application No. 62/773,709, filed on Nov. 30, 2018.

(51) Int. Cl.
*G06F 7/58* (2006.01)
*G06Q 10/10* (2012.01)
(Continued)

(52) U.S. Cl.
CPC .............. *G06F 7/588* (2013.01); *G06F 7/582* (2013.01); *G06Q 10/1095* (2013.01);
(Continued)

(58) Field of Classification Search
CPC ........ G06F 7/588; G06F 7/582; G06F 1/3231; G06Q 10/1095; G08C 23/04;
(Continued)

(56) References Cited

U.S. PATENT DOCUMENTS

| | | | | |
|---|---|---|---|---|
| 8,600,027 | B1* | 12/2013 | Doerr | H04L 12/1818 379/202.01 |
| 2005/0271194 | A1* | 12/2005 | Woods | H04M 3/56 455/518 |

(Continued)

*Primary Examiner* — Edwin C Holloway, III
(74) *Attorney, Agent, or Firm* — Crestron Electronics, Inc.

(57) ABSTRACT

Described herein are a method and security enhancing device for a bi-directional communications device, comprising: an M-digit display; a processor; a security software application (security App) adapted to be stored in memory and executed by the processor; an N-digit random number generator adapted to periodically generate a new N-digit random number and transmit the same to the processor and the security App, and wherein the processor is further adapted to transmit the N-digit random number to the display to display the N-digit random number; and a wireless communications transceiver and antenna (wireless communications device) adapted to transmit and receive wireless communications to and from, respectively, one or more personal electronic devices that are adapted to wireless communicate using identical communications protocols as the wireless communications transceiver, and wherein the security App is adapted to receive and store the N-bit digit random number that changes periodically, and wherein the security App is adapted to generate an offer to join the meeting message that is transmitted by the wireless communications transceiver to the one or more personal electronic devices, and wherein the security App is adapted to receive a request to join the meeting message from a first personal electronic device, wherein the request to join the meeting message comprises a field within which a currently displayed N-digit random number can be entered into (request to join N-digit random number), and wherein the security App is further adapted to compare the received request to join N-digit random number to the stored N-digit random number, and if they match, then the security App (Continued)

provides a communication to the processor to allow bi-directional communications with the personal electronic device that transmitted the received N-digit random number.

17 Claims, 4 Drawing Sheets (51) Int. Cl.
H04L 12/18 (2006.01)
G08C 23/04 (2006.01)
G06Q 10/1093 (2023.01)
(52) U.S. Cl.
CPC ........ G08C 23/04 (2013.01); H04L 12/1818 (2013.01); *G08C 2201/62* (2013.01)
(58) Field of Classification Search
CPC ............ G08C 2201/62; G08C 2201/20; H04L 12/1818; H04L 12/1822; G08B 13/19; G08B 21/0469; G08B 21/22; H04M 3/568; H04M 3/56; H04M 2203/50; H04M 2203/5009; H04M 3/565; H04M 2203/5072; H04R 2420/07; H04W 4/33; H04W 4/80; H04W 8/005; H04W 12/06; H04W 12/50; H04W 12/63; H04N 1/42; H04N 7/15
USPC ........................................................ 708/250
See application file for complete search history.

(56) References Cited

U.S. PATENT DOCUMENTS

| | | | | |
|---|---|---|---|---|
| 2008/0113619 | A1* | 5/2008 | Torrance | H04W 12/06 340/5.1 |
| 2011/0033033 | A1* | 2/2011 | Koul | H04L 65/403 379/202.01 |
| 2012/0058754 | A1* | 3/2012 | Couse | H04M 1/72412 455/416 |
| 2012/0185291 | A1* | 7/2012 | Ramaswamy | G06Q 10/1095 705/7.19 |
| 2017/0013415 | A1* | 1/2017 | Sigal | H04W 8/005 |
| 2017/0084287 | A1* | 3/2017 | Kim | G10L 21/0208 |
| 2018/0191885 | A1* | 7/2018 | Sarrasin | H04M 1/6033 |
| 2019/0306671 | A1* | 10/2019 | Rivkin | H04N 21/4882 |
| 2022/0122515 | A1* | 4/2022 | Kim | G09G 3/2096 |

* cited by examiner

ROLLING SECURITY CODE FOR A NETWORK CONNECTED SOUNDBAR DEVICE

PRIORITY INFORMATION

The present application claims priority under 35 U.S.C. § 119(e) to U.S. Provisional Patent Application Ser. No. 62/773,709, filed Nov. 30, 2018, the entire contents of which are expressly incorporated herein by reference.

BACKGROUND

Technical Field

Aspects of the embodiments relate to audio systems, and more specifically to systems, methods, and modes for enhancing security in use of a bi-directional communications device that includes one or more speakers and one or more microphones.

Background Art

Currently available audio systems either do not have bi-directional voice communications capabilities, or, if they do, lack security features to prevent unwanted and/or unauthorized visitors from listening in and/or participating in such conversations.

In addition, such devices are often packaged in unwieldly form factors that need to be located on a desk surface, taking up valuable surface area. In addition, such devices, even if they are packaged attractively, and contain advanced and sophisticated acoustical/audio processing devices and technology, are not located in an optimal location.

Many, if not all of the audio devices currently available, lack sophisticated networking interconnections such that managing such devices can be labor intensive. For example, if a software update needs to be implemented, then such updates may need to be implemented manually, which takes an inordinate amount of time and money.

Finally, many such devices, if they are capable of being interconnected to a network, lack true interoperability. That is, such devices cannot be treated as one of a group of devices that work together and can be managed in a much more efficient and effective manner, and which will work together to make distributed conversations and communications easier.

Accordingly, a need has arisen for systems, methods, and modes for enhancing security in use of a bi-directional communications device that includes one or more speakers and one or more microphones, to systems, methods, and modes for mounting such a device to a wall or other horizontal surface, to systems, methods, and modes for connecting and managing such a device through one or more proprietary networks including cloud based networks, and to systems, methods, and modes for interconnecting such devices through one or more proprietary networks so that management and control of such devices can occur.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for enhancing security in use of a bi-directional communications device that includes one or more speakers and one or more microphones, to systems, methods, and modes for mounting such a device to a wall or other horizontal surface, to systems, methods, and modes for connecting and managing such a device through one or more proprietary networks including cloud based networks, and to systems, methods, and modes for interconnecting such devices through one or more proprietary networks so that management and control of such devices can occur that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a security enhancing device for a bi-directional communications device is provided, comprising: an M-digit display; a processor; a security software application (security App) adapted to be stored in memory and executed by the processor; an N-digit random number generator adapted to periodically generate a new N-digit random number and transmit the same to the processor and the security App, and wherein the processor is further adapted to transmit the N-digit random number to the display to display the N-digit random number; and a wireless communications transceiver and antenna (wireless communications device) adapted to transmit and receive wireless communications to and from, respectively, one or more personal electronic devices that are adapted to wireless communicate using identical communications protocols as the wireless communications transceiver, and wherein the security App is adapted to receive and store the N-bit digit random number that changes periodically, and wherein the security App is adapted to generate an offer to join the meeting message that is transmitted by the wireless communications transceiver to the one or more personal electronic devices, and wherein the security App is adapted to receive a request to join the meeting message from a first personal electronic device, wherein the request to join the meeting message comprises a field within which a currently displayed N-digit random number can be entered into (request to join N-digit random number), and wherein the security App is further adapted to compare the received request to join N-digit random number to the stored N-digit random number, and if they match, then the security App provides a communication to the processor to allow bi-directional communications with the personal electronic device that transmitted the received N-digit random number.

According to the first aspect of the embodiments, the security App is further adapted to communicate with meeting scheduling software through the bi-directional communications device, such that a meeting start time and a meeting end time can be obtained by the security App from the meeting scheduling software.

According to the first aspect of the embodiments, the security App is further adapted to disable displaying of the N-digit random number after a first predetermined period of time, and wherein the security App if further adapted to reject any requests to join the meeting after the first predetermined period of time.

According to the first aspect of the embodiments, the security App is further adapted to obtain permission from a meeting organizer after the first period of time has passed from the meeting start time prior to authorizing a new meeting participant.

According to the first aspect of the embodiments, the security App is further adapted to disable communications between the one or more personal electronic devices and the bi-directional communication device at the meeting end time.

According to the first aspect of the embodiments, the security App is further adapted to disable communications between the one or more personal electronic devices and the bi-directional communication device at a second predetermined period of time following the meeting end time.

According to the first aspect of the embodiments, the security enhancing device further comprises a passive infra red detection device, adapted to detect the presence of a person within a room where the meeting is being held.

According to the first aspect of the embodiments, the security App is further adapted to generate and display a new N-digit random number upon the detection of the person following the first period of time.

According to the first aspect of the embodiments, the bi-directional communications device comprises a soundbar device adapted to receive locally generated voice audio signals, broadcast remotely generated voice audio signals, and transmit the locally generated voice audio signal to a remote location where the remotely generated voice audio signals originate from.

According to a second aspect of the embodiments, a method for enhancing secure communications with a bi-directional communications device is provided, the method comprising: substantially continuously generating an N-digit random number by a random number generator, displaying the N-digit random number, and storing the N-digit random number; transmitting an offer to join a meeting message to one or more personal electronic device using a wireless transceiver; receiving a request to join the meeting message from a first personal electronic device, wherein the request to join the meeting message comprises a field within which a currently displayed N-digit random number can be entered into (request to join N-digit random number); and comparing the received request to join N-digit random number to the stored N-digit random number, and if the received request to join N-digit random number matches the stored N-digit random number, enabling wireless communications between the first personal electronic device and the bi-directional communications device.

According to the second aspect of the embodiments, the step of generating an N-digit random number comprises generating a new N-digit random number periodically.

According to the second aspect of the embodiments, the method further comprises: operating a meeting scheduling software application in the bi-directional communications device; and obtaining a meeting start time and a meeting stop time.

According to the second aspect of the embodiments, the method further comprises: disabling the display of the N-digit random number after a first predetermined period of time; and rejecting any further requests to join a meeting after the first predetermined period of time.

According to the second aspect of the embodiments, the method further comprises obtaining permission from a meeting organizer after the first period of time has passed from the meeting start time prior to authorizing a new meeting participant.

According to the second aspect of the embodiments, the method further comprises disabling communications between the one or more personal electronic devices and the bi-directional communication device at the meeting end time.

According to the second aspect of the embodiments, the method further comprises: disabling communications between the one or more personal electronic devices and the bi-directional communication device at a second predetermined period of time following the meeting end time.

According to the second aspect of the embodiments, the method further comprises: detecting a presence of a person in a room within which the bi-directional communication device is located by using a passive infra-red detector.

According to the second aspect of the embodiments, the method further comprises: generating and displaying a new N-digit random number upon the detection of a person following the first period of time.

According to the second aspect of the embodiments, the bi-directional communications device comprises a soundbar device adapted to receive locally generated voice audio signals, broadcast remotely generated voice audio signals, and transmit the locally generated voice audio signal to a remote location where the remotely generated voice audio signals originate from.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio systems and devices, audio-networking devices, and mechanical systems related to audio systems and devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of systems, methods, and modes for enhancing security in use of a bi-directional communications device that includes one or more speakers and one or more microphones, to systems, methods, and modes for mounting such a device to a wall or other horizontal surface, to systems, methods, and modes for connecting and managing such a device through one or more proprietary networks including cloud based networks, and to systems, methods, and modes for interconnecting such devices through one or more proprietary networks so that management and control of such devices can occur, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as further embodied in the attached drawings, can be manufactured by Crestron Electronics Inc., located in Rockleigh, N.J., and will be marketed and sold.

Used throughout the specification are several acronyms, the meanings of which are provided as follows:
μs Microseconds
Amp Amplifier
ASP Audio Signal Processor
AVB Audio Video Bridging
BT Bluetooth
BYOD Bring Your Own Device
CEC Consumer Electronics Control
Codec Analog-Digital Coder-Decoder
dB Decibels
DNA Distributed Network Audio
DSP Digital Signal Processor
EQ Equalization
GAN Global Area Network
HDMI High Definition Multimedia Interface
Hz Hertz
I/O Input/Output
IP Internet Protocol
kHz Kilo-Hertz
LAN Local Area Network
LCD Liquid Crystal Displays
LED Light Emitting Diode
mA milli-Ampere
Mic Microphone
NFC Near Field Communications
PDA Personal Digital Assistant
PED Personal Electronic Device
PEQ Parametric Equalizer
PII personally identifiable information
PIR Passive Infra-red (PIR) Detector
PoE Power-over-Ethernet
RNDIS Remote Network Device Interface Specification
RNG Random Number Generator
RSTP Rapid Spanning Tree Protocol
SIP Session Initiation Protocol
USB Universal Serial Bus
VDC Volts Direct Current
W Watts
WAN Wide Area Network The following is a list of the elements of the figures in numerical order:
100 Soundbar
102 Box/Shell
104 Microphone Input Processor (Mic Pod)
106 Microphone (Mic)
108 Digital Signal Processor (DSP)
110 Bluetooth (BT) Antenna
112 BT Transceiver
114 Output Audio Jack
116 Audio Signal Processor
118 Processor
120 Universal Serial Bus (USB) Hub
122 USB Video Input
124 Video Camera
126 Display
128 Host (User) Computer Device
130 Analog-Digital Coder-Decoder (Codec)
132 Analog Output Audio Amplifier (Amp)
134 Speaker
136 Digital Audio Output Audio Jack
138 Analog Audio Output Audio Jack
140 External Mic Pod
142 Ethernet Ports
144 Ethernet Switch
146 USB Audio Input/Output (I/O) Transceiver
148 USB 3.0 I/O Transceiver
150 Network (LAN, WAN, GAN (internet))
152 Passive Infra-red (PIR) Detector
200 Room
202 Table
204 User/Person
300 Soundbar Rolling Security Code Communication Enablement Apparatus (Rolling Security Code Apparatus)
302 N-Digit Random Number Generator (RNG)
304 M-Digit Display
306 Rolling Security Code Communication App (Rolling Code App)
308 Personal Electronic Device (PED)

310 Door
312 BT Communications App
400 Method for Establishing and Maintaining a Rolling Code Guarded Communications Between One or More Users and Soundbar 100
402-412 Method Steps of Method 400

Aspects of the embodiments are directed towards, among other devices and systems, a soundbar, which is a device that includes one or more of the following: one or more speakers, one or more microphones, digital signal processing (DSP) capabilities, echo cancellation processing; ambient noise reduction processing; high definition multimedia interface (HDMI), universal serial bus (USB), and Bluetooth (BT) connectivity, among other features and functionalities.

Figure 1:
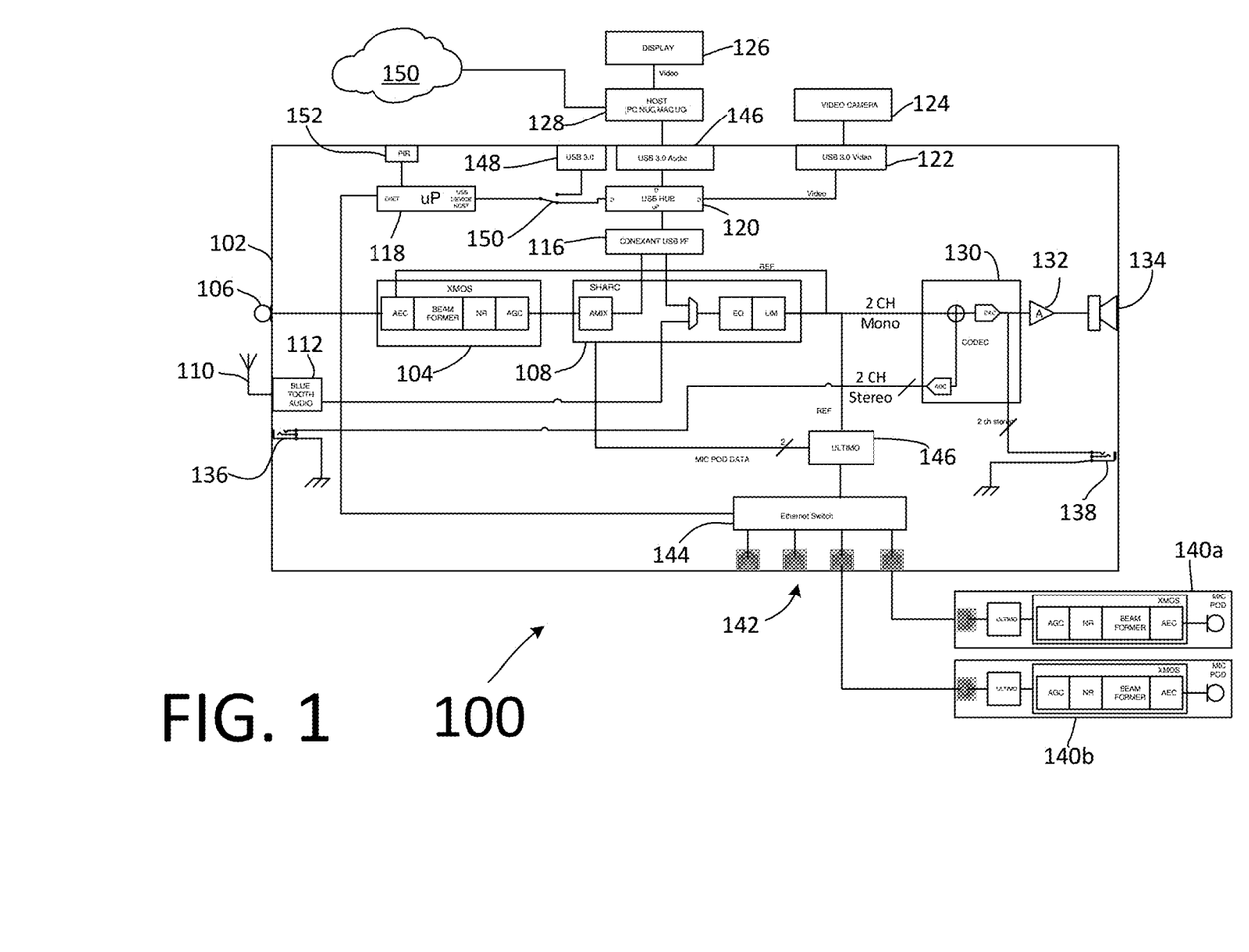
FIG. 1 illustrates a schematic block diagram of a network connected soundbar audio and communications device according to aspects of the embodiments.

FIG. 1 illustrates a schematic block diagram of network connected soundbar audio and communications device (soundbar device) 100 according to aspects of the embodiments.

According to aspects of the embodiments, soundbar device 100 comprises box/shell 102, microphone (Mic) signal processor (Mic pod) 104, Mic 106, digital signal processor (DSP)108, BT antenna 110, BT transceiver 112, output audio jack 114, audio signal processor (ASP) 116, processor 118, USB hub 120, USB video input 122, analog-digital coder-decoder (Codec) 130, analog output audio amplifier (Amp) 132, one or more speakers 134, digital audio output audio jack 136, analog audio output audio jack 138, Ethernet ports 142a-d, Ethernet Switch 144, USB audio input/output (I/O) transceiver 146, USB 3.0 I/O transceiver 148, and passive infra-red (PIR) detector 152 interconnected in the manner shown in FIG. 1. According to further aspects of the embodiments Ethernet ports 142, which can be placed on the rear of soundbar 100, though not necessarily, facilitate interconnections to network 150 such as the internet.

Although not specifically part of soundbar 100, the following components facilitate the use of, and/or provide additional functionality and features the make soundbar 100 more useful in various applications such as corporate boardrooms, classrooms, and virtually any location where distance learning/communications capabilities are required. Such external components can include one or more of video cameras 124 (with a USB video output, though that need not necessarily be the case, as virtually any video transmission technology can be used, such as HDMI), display 126 (such displays can include light emitting diode (LED) displays, liquid crystal displays (LCD), among other types/technologies), host computer 128, one or more external Mic pods 140a,b, and network 150. Network 150 can be any one or more of a local area network (LAN) e.g., a closed network within a campus or enterprise location, a wide area network (WAN), which can include two or more LANs, or can be conceptually appreciated as a LAN but of much wider geographical scope, or a global area network (GAN), such as the Internet. One or more of the LAN and WAN can also be included in, incorporated with, or connected to the Internet, and such networks can be accessible via many different means such as fiber optic/cable systems, cellular systems, satellite systems, and the like.

According to further aspects of the embodiments, the operation of substantially if not all of the devices/components that make up soundbar 100, listed above, are either known to those of skill in the art, and/or are not needed to understand the aspects of the embodiments, and/or are beyond the scope of this discussion; therefore, in fulfillment of the dual purposes of clarity and brevity, a detailed discussion of the components of soundbar 100 have been omitted from herein.

According to further aspects of the embodiments, soundbar 100 device can be implemented as a web conferencing soundbar 100 with integrated camera. Sound bar 100 device can include a wide-angle, 110° field-of-view camera (e.g., video camera 124), high quality speakers (speakers 134), a far-field microphone array (mic pods 140a,b), echo cancellation signal processing, ambient noise reduction signal processing, Bluetooth® and USB connectivity, and HDMI algorithms. Echo cancellation and ambient noise reduction can facilitate the elimination of distracting background noises.

According to further aspects of the embodiments, soundbar 100 includes HDMI, USB and Bluetooth® connectivity to support "Bring Your Own Device" (BYOD) environments as well as integration with other audio devices for an enhanced and intuitive room collaboration experience. Consumer Electronics Control (CEC) display controls can turn the display on or off in response to triggers. Sound bar 100 device's dedicated audio inputs and outputs can be used to integrate additional technology such as hearing-enhanced systems. According to aspects of the embodiments, soundbar 100 incorporates BT connected audio.

Figure 2:
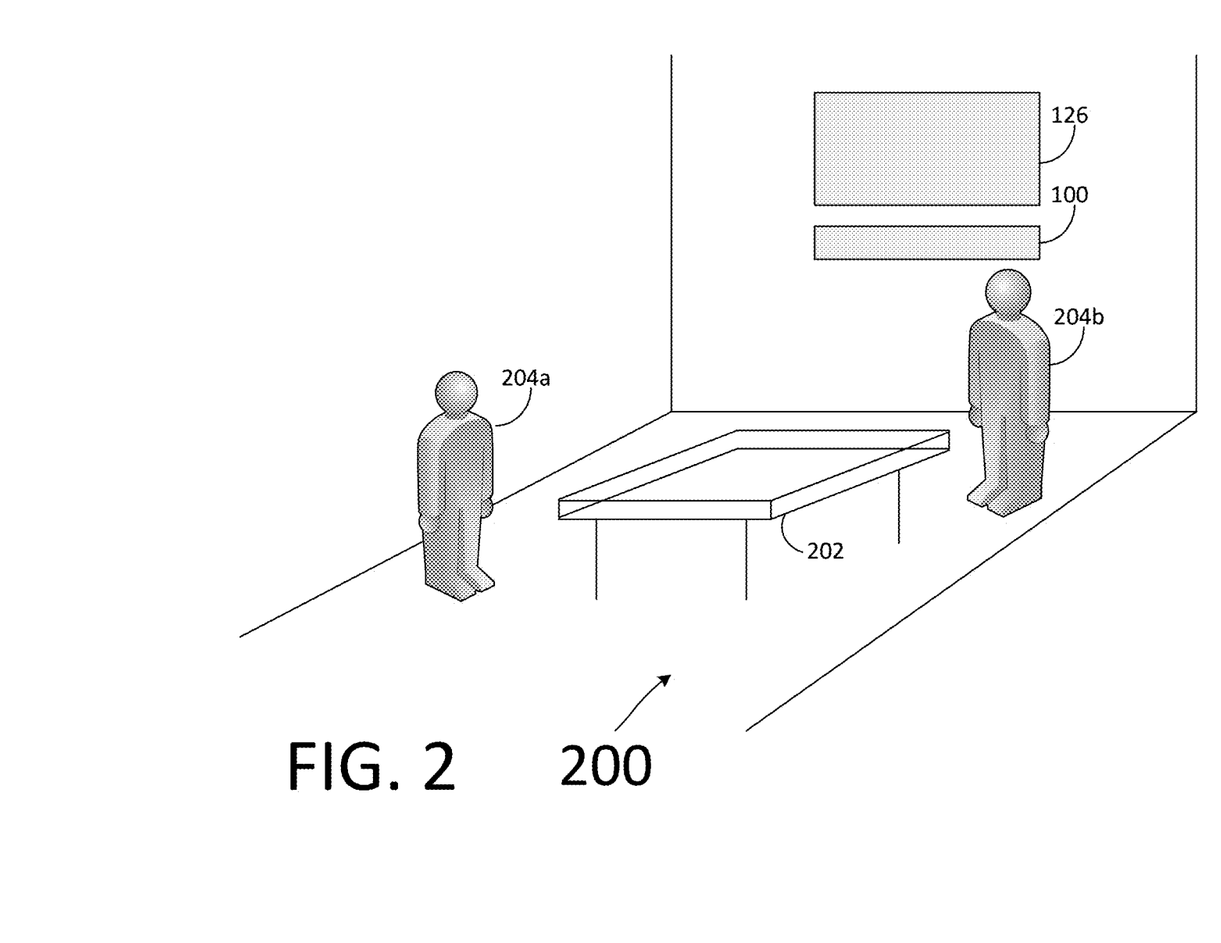
FIG. 2 illustrates a first view of a conference room within which the network connected soundbar audio and associated display is located and operates within according to aspects of the embodiments.

FIG. 2 illustrates a first view of conference room 200 within which soundbar 100 can be located and operate within according to aspects of the embodiments. According to aspects of the embodiments, soundbar 100 comprises CEC display control; that is, soundbar 100 can turn the display on and off in response to triggers, making it relatively easy for users to get started with their meeting. By way of non-limiting example, by plugging a laptop into soundbar 100, soundbar 100 can turn on and show the laptop content. Because this is all done with CEC, there are no additional cables or programming required. According to further aspects of the embodiments, soundbar 100 includes remote control functions, such as volume control, mute, source and call control. According to still further aspects of the embodiments, soundbar 100 incorporates an integrated mounting bracket, which facilitates installation by a single person. This mount allows installers to connect and route all the cabling with soundbar 100 on a wall and then simply rotate soundbar 100 into position. As shown in FIG. 2, one or more users 204a,b can interface with soundbar 100 in the manner described above. Soundbar 100 can mounted on table 202, or on the wall in room 200 (as shown), along with display 126.

Figure 3:
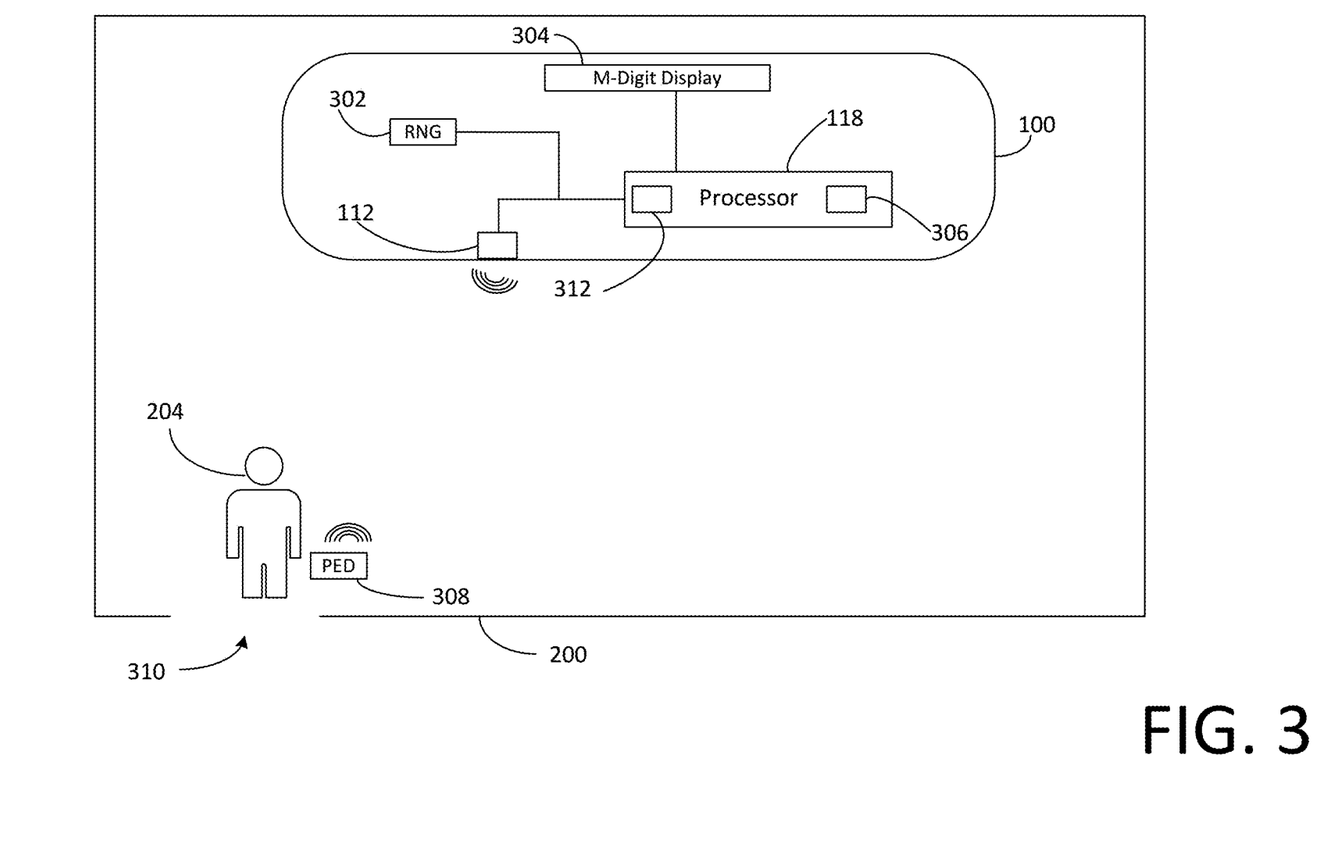
FIG. 3 illustrates a block diagram of a portion of the soundbar shown in FIGS. 1 and 2 that include a soundbar rolling code communication enablement apparatus according to aspects of the embodiments.

FIG. 3 illustrates a block diagram of a portion of soundbar 100 as shown in FIGS. 1 and 2 that include soundbar rolling security code communication enablement apparatus (rolling security code apparatus) 300 according to aspects of the embodiments. Rolling code apparatus 300 comprises N-digit random number generator (RNG) 302, M-digit display (display) 304, and rolling security code communication application (rolling code App) 306 according to aspects of the embodiments. Also shown in FIG. 3 are personal electronic device (PED) 308, and door 310 to room 200.

According to aspects of the embodiments display 304 utilizes either an LED display, or LCD that is typically not visible unless it is displaying something. Other display technologies can also be used, and the number of digits can vary as well.

According to aspects of the embodiments, use of rolling security code apparatus 300 enables secure use of soundbar 100 by allowing only those present in room 200 at the time of a meeting to access soundbar 100. This discussion presumes only for the non-limiting purpose of this discussion that an intended use of soundbar 100 is for secure meetings; however, such intended use is not to be taken in a limiting manner, and is intended only as an example of a one of many uses only; that is, a person employed by an Enterprise that owns soundbar 100, or the person(s) that have one in their personal residence are, of course, free to use soundbar 100 in a manner consistent with the discussion herein, or in any manner that they see fit.

As discussed above, rolling security code apparatus 300 includes RNG 302, display 304, and rolling code App 306. Rolling security code apparatus 300 operates in the following manner. RNG 302 substantially continuously but periodically generates an N-digit code that is transmitted periodically to processor 118. Processor 118 performs at least two operations with the received N-digit code. First, it displays the same on M-digit display 304. Note that M is equal to or greater than N; otherwise, the entire N-digit code could not be displayed; having an "M" bit display wherein M>N allows room for growth should additional security be needed. The second thing processor 118 does with the N-digit code is to forward the N-digit code to rolling code App 306 that resides in memory accessible and processed by processor 118 according to aspects of the embodiments.

BT communications App 312 also resides in memory that is accessible and processed by processor 118. BT communications App 312 enables BT communications, and processor 118 also accesses many other applications that perform functions associated with soundbar 100. According to further aspects of the embodiments, rolling code App 306 interfaces with BT communications App 312 to allow previously unknown users the ability to communicate with soundbar 100.

According to aspects of the embodiments, rolling code App 306 receives the periodically generated and received N-digit code from RNG 302. Rolling code App 306 stores the N-digit code for a pre-determined period of time, and when a new one is received, it writes over the old N-digit code with the new one. Rolling code App 306 interfaces with BT communications App 312. BT communications App 312 uses BT transceiver 112 to substantially constantly transmit the identity of soundbar 100 via BT transmissions, and listening for responses. According to further aspects of the embodiments, soundbar 100 can use such substantially constant BT transmissions to find new users of soundbar 100 or can use PIR detector 152 to detect new users, and only then facilitate communications from BT transceiver 112 and BT communications App 312. As those of skill in the art can appreciate, a BT transmission from BT transceiver 112 and BT communications App 312 includes an identifier of the device that is transmitting the BT communications, in this case soundbar 100. Such identifier can include an alphanumeric code, such as "CRSTN_SNDBR_236791," wherein "CRSTN" can represent the manufacturer of soundbar 100, Crestron Electronics, Inc., of Rockleigh N.J. "SNDBR" can represent the particular device, in this case a soundbar 100 device, and the last "n" digits can be a unique identifier, such as a serial number (ID). Such identifiers can comprise alpha-only characters, numeric-only characters or other combinations as well.

According to further aspects of the embodiments, rolling code App 306 can maintain a list of currently connected PEDs 308. Rolling code App 306 can periodically check the currently connected PEDs 308 to verify their presence in the room within which the meeting is being held. If for some reason a PED 308 is shut off (e.g., dead battery), or the person using PED 308 leaves the meeting, rolling code App 306 can terminate communications with that particular PED 308 in order to further enhance security of communications with soundbar 100.

Once a user receives the BT transmitted soundbar 100 identifier on PED 308, the user has a predetermined amount of time to enter the N-digit code in the "password" section of the BT response back to soundbar 100, as is known to those of skill in the art. In place of the password, however, the continuously changing N-digit code would be used. The N-digit code would only be available to those located within room 200 according to aspects of the embodiments, as only those people/users 204 would be able to see the N-digit code on N-digit display 304. According to further aspects of the embodiments, the N-digit code can be used to encode substantially all transmissions to and from PED 308 using the N-digit code as an encoding or encryption key in all BT transmissions between soundbar 100 and PED 308 and the user.

Once the user enters the N-digit code into the password section of the BT communications enablement application, and transmits it to soundbar 100, BT transceiver 112 receives the communication and forwards it to rolling code App 306. BT transceiver 112 recognizes the communication from PED 308a as being a "join meeting" communication as it is the first communication from this device, and it is formatted in a unique manner. The communication from PED 308 also contains a unique identifier (phone number, or other identification number) of PED 308a, and forwards that information to rolling code App 306. Rolling code App 306 receives the transmitted message from PED 308a, and checks the N-digit code in the communication from 308a to the N-digit code stored and displayed. If the two match, then rolling code 308a sends a confirmation message to both PED 308a and processor 118 that this particular PED 308a can participate in the current or soon to be started meeting.

According to further aspects of the embodiments, soundbar 100, rolling code App 306, BT communications App 312 perform this logon/secure communications process for any PED that attempts to join the current or soon to start meeting. According to further aspects of the embodiments, rolling code App 306 can periodically check all of the previously registered PEDs 308 from time to time to verify they are still in the vicinity during the current meeting, using one or more additional communication confirmation messages. According to further aspects of the embodiments, rolling code App 306 can incorporate a hard time out, meaning that unless a manual override is performed, all BT communications will cease. Such hard time out can be preceded by a message to an organizer of the meeting (the person that set up the meeting). In addition, other time outs can include soft time outs, that would occur based on a predicted meeting duration, or a communication from a meeting set-up Application that would include a duration extracted automatically from meeting set-up software parameters.

Described above is a system and method for providing secure communications between participants in a meeting that includes a soundbar 100, and these communications have been described as occurring using BT technology. According to aspects of the embodiments, the systems and methods are not limited thereto, and can include near field communications (NFC) devices/applications, WiFi devices/applications, infra-red communications devices and related applications, among other types of communications technologies.

Soundbar 100 can detect a new user in the room in which it is located, either through PIR detector 152, BT lookup in regard to a mobile device that the person might be carrying, or other means. The detection sensitivity of the PIR detection device can be programmable. Once detection by one or more means has been accomplished, soundbar 100 can use that to trigger a random number generator that generates a four-digit pairing code. The four-digit pairing code can then be displayed for a predetermined amount of time to allow the user to pair the mobile device to soundbar 100. Such mobile devices are not just limited to cellular phones but can also be personal digital assistant (PDAs) devices, laptop computers, among other devices. The four digit pairing code (the number of digits could be different if BT and other communication technologies required them to be different) can only be used by one device; once the device is paired, or the time for pairing expires, a new pairing code can be generated if other people/devices are determined to be within the room that soundbar 100 is located.

According to further aspects of the embodiments, once the call is complete, or lost, the code automatically changes after a predefined amount of time and the previous code is no longer available to connect. According to aspects of the embodiments, use of rolling codes with soundbar 100 substantially prevents random connections to soundbar 100, by either previously connected people or unauthorized people, while walking by a conference room with a soundbar 100 in it; the users of soundbar 100 are thereby relatively assured of the privacy of their electronic and audio communications.

According to aspects of the embodiments, BT pairing occurs through conventional BT pairing processes on smartphones and other BT communication capable devices. As those of skill in the art can appreciate, such "smart" devices typically are always "sniffing" electronically for BT devices to pair with, and if the settings page were monitored it can be seen that numerous devices are being interrogated almost constantly. The user needs to enter the code, however, to enable the pairing process.

Figure 4:
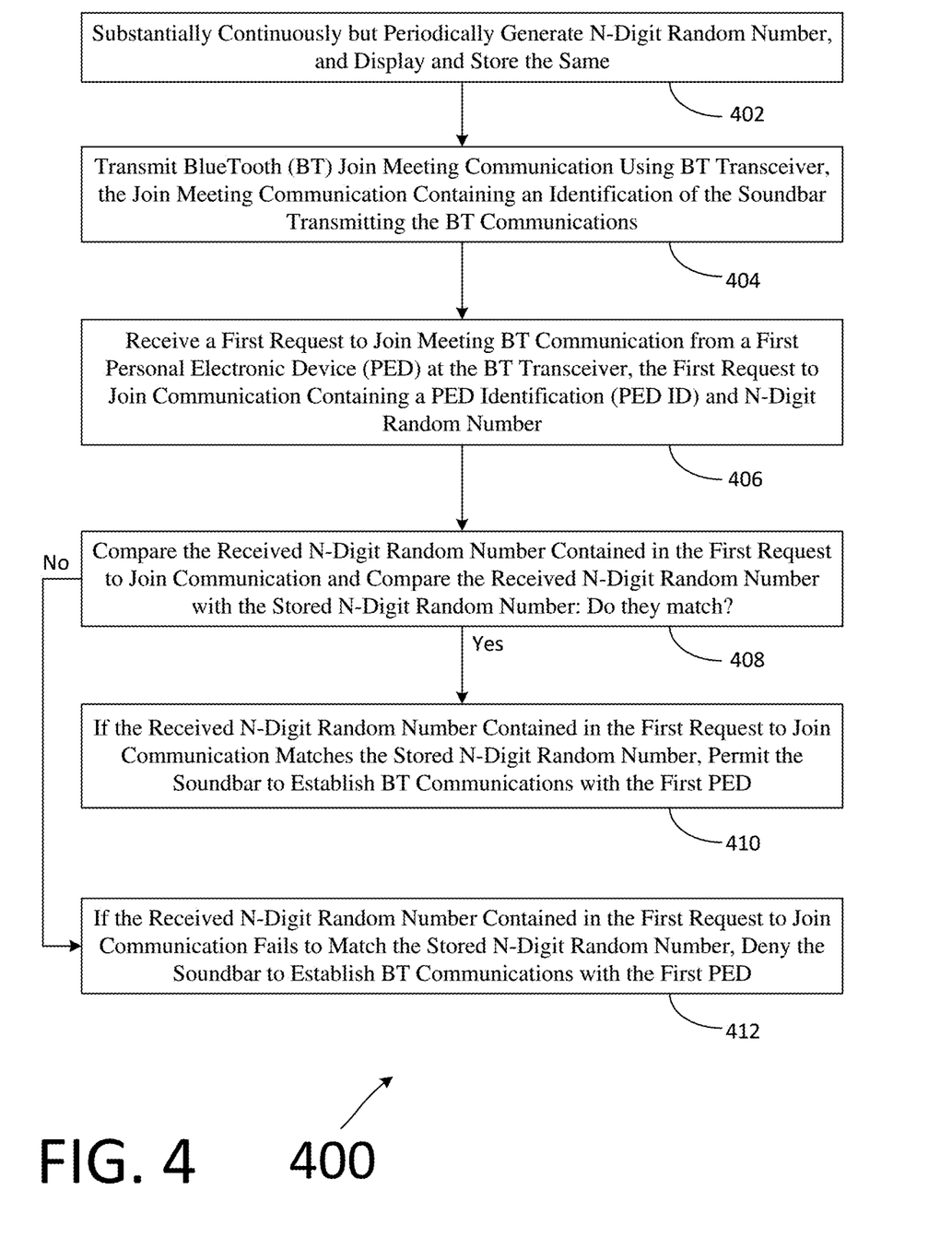
FIG. 4 illustrates a method for enabling communications between one or more personal electronic devices and the soundbar shown in FIGS. 1-3 using a rolling N-digit code as a means for security according to aspects of the embodiments.

FIG. 4 illustrates a method for enabling communications between one or more PEDs 308 and soundbar 100 as shown in FIGS. 1-3 using a rolling N-digit code as a means for security (method 400) according to aspects of the embodiments. The discussion of method 400 includes numerous steps that describe one or more aspects of the embodiments of using rolling security code apparatus 300 with soundbar 200 and PEDs 308; however, the discussion of method 400 is not meant to be taken in a limited manner as other steps can be performed in addition to, or in lieu thereof. This discussion of method 400 is meant merely to illustration one or more aspects of the embodiments but not all of the aspects of the embodiments.

Method 400 begins with method step 402 in which soundbar 100 and rolling security code apparatus 300 substantially continuously but periodically generates an N-digit random number and displays the same on M-digit display 304 (in which M is greater than or equal to N) and stores the same for later processing.

In method step 404, soundbar 100 and rolling security code apparatus 300 substantially continuously but periodically transmit a join meeting communication into room 200 via BT transceiver and BT communications App 312. The join meeting communication contains an identifier of soundbar 100. Method 400 and soundbar 100 and rolling security code apparatus 300 continually transmit the join meeting communication on a periodic basis, waiting for a response from a user with a BT enabled PED 308.

According to further aspects of the embodiments, soundbar 100 and rolling security code apparatus 300 do not necessarily substantially continuously but periodically transmit the join meeting communication into room 200. That is, soundbar 100 and rolling security code apparatus 300 can transmit the join meeting communication in the manner described above for a first period of time, by way of non-limiting example, for the first 5-10 minutes after the meeting has started. Once the first time period has passed, soundbar 100 and rolling security code apparatus 300 can clear display 304 so that no N-digit random number is displayed, further enhancing security. At this point, soundbar 100 and rolling security code apparatus 300 can presume that all of the attendees have arrived and not accept any further requests to join the meeting.

Soundbar 100 and rolling security code apparatus 300 can obtain the meeting start time from the meeting software/application automatically, or the organizer can alert soundbar 100 and rolling security code apparatus 300 as to when the meeting starts, especially if the meeting does not start on time. According to further aspects of the embodiments, once the first period of time has passed, soundbar 100 and rolling security code apparatus 300 can use PIR detector 152 to provide an alert as to the presence of a new use or meeting attendee. According to still further aspects of the embodiments, soundbar 100 and rolling security code apparatus 300 can seek clearance from the meeting organizer as to whether or not to send a join meeting communication and/or display a new code.

In method step 406, soundbar 100 and rolling security code apparatus 300 receives a first request to join meeting BT communication from a first BT enabled PED 308a operated by a first user. The first request to join meeting BT communication from PED 308a includes a unique identifier of PED 308a, as well as the N-digit random number that was previously displayed for the user to see and enter into their PED 308a when responding to the request to join meeting communication. The operation of entering the N-digit random number that is being displayed by display 304 is similar to the operation of entering a password to a BT transmitting device in one's home, but is not static, as the N-digit random number changes from time to time. The period of changing the N-digit random number is programmable, and can be practically any value, but typically might be two minutes, three minutes, or some similar duration. The duration itself can change periodically, meaning a first N-digit random number could be displayed and usable for two minute and then the next, second N-digit random number could be displayed and usable for three minutes, and so on. According to aspects of the embodiments, changing the N-digit random number sign-on code provides enhanced security as this substantially prevents snooping and eavesdropping by unauthorized personnel.

Following method step 406, method 400 proceeds to decision step 408, in which the value of the N-digit random number (if there is one) in the first request to join meeting BT communication is compared by soundbar 100 and rolling security code apparatus 300 to the N-digit random number that was previously stored and displayed; as those of skill in the art can no doubt appreciate, it is entirely possible that by the time a user enters the displayed N-digit random number, a new one can already have been generated and displayed; according to aspects of the embodiments, soundbar 100 and rolling security code apparatus 300 and method 400 can permit one or more previously displayed N-digit random numbers to be entered and allow the user to join. Or, according to further aspects of the embodiments, such permission can extend only for a short period of time (changeable) following the generation of the new N-digit random number. For example, if a first N-digit random number has been generated and displayed, and the first user sees it and enters it into her PED 308a, but prior to transmission a new N-digit random number is generated and displayed, soundbar 100 and rolling security code apparatus 300 can allow the previous N-digit random number to be used for perhaps 30 seconds, or some other programmable period of time. The period of time used in this non-limiting example is meant to be exemplary only, and not to be taken in a limiting manner.

If the N-digit random number contained in the request to join communication matches the stored N-digit random number ("Yes" path from decision step 408, then method 400 proceed to step 410, in which soundbar 100 is permitted to establish communications with the first PED 308a.

If the N-digit random number contained in the request to join communication does not match the stored N-digit random number ("No" path from decision step 408, then method 400 proceed to step 412, in which soundbar 100 is not permitted to establish communications with the first PED 308a. Method 400 repeats for as long as the meeting is held, or according to previously determined time limits in the manner as discussed above.

According to aspects of the embodiments, soundbar 100 can be connected to a network, such as the internet, and through the internet to the Cloud. As such, soundbar 100 can be provisioned, managed and configured through the Cloud. For example, and according to further aspects of the embodiments, BT codes as discussed above in regard to the Rolling Security Code feature can be managed via the XiO Cloud. According to still further aspects of the embodiments, a dashboard can be implemented that displays the status of soundbar 100.

According to aspects of the embodiments, soundbar 100 implements an audio video bridging (AVB) type network, which implements a set of protocols being developed by the IEEE 802.1 Audio/Video Bridging Task Group. According to aspects of the embodiments, there are at least four primary differences between the proposed architecture and existing 802 architectures: Precise synchronization, Traffic shaping for media streams, admission controls, and Identification of non-participating devices.

According to further aspects of the embodiments, soundbar 100 can be referred to as a USB audio device that works together with other devices, such as a PC, among others, all of which interface to soundbar 100 using the USB port. The soundbar 100 also incorporates at least one, two, or more Ethernet ports to connect to external microphone Pods.

In addition, soundbar 100 provides a standard Ethernet port and Remote Network Device Interface Specification (RNDIS) port. As those of skill in the art can appreciate, the latter is essentially a port that uses an Ethernet protocol on USB interface to connect to a PC and/or other systems (e.g. XIO server) for system management and/or firmware updates, among other uses.

According to further aspects of the embodiments, soundbar 100 can communicate with other devices as a peripheral audio device (i.e. microphone and speaker), and USB camera, and this interface can use standard USB interface.

According to further aspects of the embodiments, soundbar 100 can communicate with other devices as a microphone Pod, and in this case, the communications occur as a networked audio device, and this interface can use LAN power-over-Ethernet (PoE) connection. According to aspects of the embodiments, one non-limiting example of an audio network communications system and protocol is Dante. Such systems and communication protocols can also be referred to as audio-over-internet protocols (IP), or audio-over-Ethernet.

According to further aspects of the embodiments, soundbar 100 can communicate with other devices to receive system configuration, program, or firmware updates, and this interface can use LAN and/or USB connection (via RNDIS).

According to further aspects of the embodiments, soundbar 100 can communicate with other devices for system management and routing of "join" messages, including proprietary software symbols, and this interface can use a LAN connection.

According to still further aspects of the embodiments, soundbar 100 can communication with other devices to receive system configuration, management, and firmware updates, and this interface can use a LAN connection.

According to aspects of the embodiments, soundbar 100 provides a convenient USB peripheral audio device interface, that can interface with, among other devices, USB audio devices (microphone & speaker).

According to aspects of the embodiments, soundbar 100 supports mobile devices such as smart phones, and BT audio device with intuitive pairing functionality.

According to aspects of the embodiments, soundbar 100 supports networked audio microphones and speakers, including audio-over-IP audio devices.

According to aspects of the embodiments, soundbar 100 provides a convenient USB camera interface for USB enabled camera devices.

According to aspects of the embodiments, soundbar 100 provides a wide audio frequency range, such as its microphone frequency response of about 20 hertz (Hz) to about 20 kilohertz (kHz).

According to aspects of the embodiments, soundbar 100 provides high quality audio, with an audio sample rate of up to about 16 kHz.

According to aspects of the embodiments, soundbar 100 supports high-end/high-power speakers, yet automatically conserves power without audio, and can drive an audio amplifier with up to about 20 watts (W) of speakers with automatic power management.

According to aspects of the embodiments, soundbar 100 supports automatic detection of room activity and intuitive BT device pairing, for use in occupancy detection.

According to aspects of the embodiments, soundbar 100 provides a convenient PC interface for control or configuration without a LAN connection, and can use an RNDIS connection.

According to aspects of the embodiments, audio devices (soundbar 100 being one non-limiting example) with distributed network audio (DNA) capabilities includes scalability in terms of the number of inputs it can accept, and interfacing with various audio-over-IP technologies, that are known to those of skill in the art. FIG. 13 illustrates a schematic block diagram of a network connected soundbar 100 audio and communications device according to aspects of the embodiments. According to aspects of the embodiments, DNA devices includes streaming support and integration, an expandable input capability, reliable connectivity and zone expandability, integrated ducking and chime support, and native voice control integration and playback capabilities.

In addition, and according to further aspects of the embodiments, DNA devices can be characterized as an integrated audio streaming solution device, and supports basic streaming services, interconnectivity with legacy audio devices, scalability without cable or network limitations, high quality configurable amplifiers, and simple connectivity and control with other network capable device.

According to aspects of the embodiments, DNA devices incorporates true audio matrix capability. DNA devices can interface with a "smart" microphone device that utilizes PoE, and which will serve as a peripheral to the commercially available voice services, such products being known to those of skill in the art. According to aspects of the embodiments, the end user can activate the voice services through the PoE Smart Mic.

According to aspects of the embodiments, DNA devices can also be enabled to work with Dante, in one non-limiting example, as well as any audio-over-IP communications systems and protocols, and can further incorporate at least two Ethernet Ports, each of which has at least two dedicated LEDs. In addition, DNA devices can have a trigger output for each zone of audio out and can use phoenix type connectors as the trigger interface; those of skill in the art can appreciate that the use of phoenix type connectors is a non-limiting example only.

According to aspects of the embodiments, DNA devices, the phoenix connectors for all outputs (4 or 8) can be ganged all together and will be designed mechanically to be as user friendly and compact as possible.

According to aspects of the embodiments, the trigger outputs of DNA devices can drive the trigger inputs on commercially available amplifiers; as those of skill in the art can appreciate, these generally include +12 volts direct current (VDC) (+5 VDC to +15 VDC is about a maximum range) and a maximum of about 50 milli-amperes (mA) per trigger output. As those of skill in the art can appreciate, any and all such ranges, and voltage levels and other specification numbers are by way of non-limiting example only.

According to aspects of the embodiments, DNA devices can further incorporate 2 or 4 VersiPort connections to interface with third party sensors, detectors, contact closures, and alarms, among other devices (as those of skill in the art can appreciate the number of VersiPorts is non-limiting, and described herein by way of non-limiting example only). The use of VersiPort can incorporate usage in at least three modes: local processing, remote processing, and mixed processing. According to aspects of the embodiments, in local processing mode the web-based user interface can be used to configure the VersiPorts as inputs or outputs, configure 'action' based on an input trigger, and configure 'action' based on an output trigger. According to aspects of the embodiments, available actions in regard to the configurable can include start/stop of an external audio source, start/stop of a music stream (track, album, or playlist), and triggering a chime from an onboard chime library.

According to further aspects of the embodiments, when DNA devices is set to remote processing mode, DNA devices can be used by an external control system. Further, when in the remote processing mode, DNA devices can be made available as an I/O extender device that can be programmed.

In the mixed processing mode, web user interface of DNA devices can be used to assign some VersiPorts to local processing and some to host processing. The VersiPorts that are set for local mode can be configured in the web user interface similar to local processing mode.

The VersiPorts of DNA devices device can be connected through 3.5 mm detachable (Phoenix-type) terminal blocks comprising digital input/outputs or analog input ports (referenced to ground). According to further aspects of the embodiments, the digital inputs can be rated for 0-24 VDC, with an input impedance of about 20 k ohms, and a logic threshold of about 1.25 VDC. Still further, digital outputs can be rated with about a 250 mA sink capability and a maximum output voltage of about 24 VDC. The analog inputs can be rated to accept about 0 to about 10 VDC, protected to about 24 VDC maximum, with an input impedance of about 20 k ohms.

According to further aspects of the embodiments, DNA devices can have audio settings available to the dealer/installer during setup/configuration of the products that include input/output routing, bridging, bussing, stereo or mono/mix for stereo channel pairs, custom volume ranges for stereo channel pairs, volume limits and offsets, minimum volume level per channel, maximum volume level per channel, default "On-volume" level per channel pair, input volume ramp-up time per channel (this is the time it takes from turning on audio in the zone to it reaching the default "On-volume" level, According to further aspects of the embodiments, DNA devices can include Zone Off volume duck time—this is the time it takes from turning off a zone to audio ducking to off (by default this is Off, no ducking), and Zone Chime volume duck/ramp time—this is the time it takes from turning off a zone.

According to further aspects of the embodiments, DNA devices can include custom equalization incorporated as a 5-band parametric equalizer (PEQ). The PEQ Filter can have the following PEQ types: EQ, High Pass, Low Pass, Treble Shelf, Bass Shelf, and Notch. According to further aspects of the embodiments, the PEQ Center Frequency can range from about 10 Hz to about 20,000 Hz per band, can include a PEQ gain of about ±12.0 decibels (dB) per band, can further include a PEQ bandwidth of about 0.1 to about 3.5 octaves per band.

According to further aspects of the embodiments, DNA devices can include a balance control for channel pairs, tone controls that include the ability to show/hide the tone controls from the end user (by default, according to an embodiment, the status is off and the feature is shown to end user), tone profiles (with pre-reserved, pre-defined modes such as "Flat," "Classical," "Jazz," "Pop," "Rock," and "Spoken Word."

According to further aspects of the embodiments, DNA devices can include a loudness control that includes the ability to show/hide the status from the end user (by default, according to an embodiment, the status is off, and the feature is shown to the end user.

According to further aspects of the embodiments, DNA devices can include a delay function, up to about 2 seconds (s) per channel, though other delay values can be implemented as well, and the 2s delay is by way of non-limiting example only.

According to further aspects of the embodiments, DNA devices can include circuitry that can synchronize with networked audio/video signals, embodied in one particular format as "NVX" as manufactured by Crestron Electronics, Inc., of Rockleigh, N.J. These AV and DNA devices can include the capability to communicate with each other to ensure that audio/video and audio-only synchronization is maintained throughout a system. According to further aspects of the embodiments, DNA devices can incorporate features that substantially eliminate the need of the dealer and/or end user to intervene to tweak synchronization within about +/−100 microseconds (ps).

According to further aspects of the embodiments, DNA devices incorporates a built-in architecture that facilitates routing of audio-over-IP signals. Examples of such audio-over-IP protocols include, but are not limited to Dante, AES-67, or any other supported Audio over Ethernet transport standard developed in the future.

According to further aspects of the embodiments, DNA devices includes a built-in managed Gigabit network switch. The network switch can support multiple configurations, including at least one or more of shared and isolated. In a share configuration according to aspects of the embodiments, audio is transmitted over IP traffic (audio-over-IP) and Ethernet data traffic is shared throughout the network switch. In the shared configuration, only one physical cable is needed and only one IP address will show up on the network. In the isolated configuration, audio-over-IP traffic is isolated from Ethernet data traffic, and at least two physical cables are needed—one for data and one for the audio-over-IP, and at least two IP addresses will show up, one for each port.

According to further aspects of the embodiments, DNA devices supports at least the following features: IPGMPv2, IPGMPv3, IPGMPv2 snooping, IPGMPv2 querier, IGMPv3 querier, IPGMPv3 snooping, rapid spanning tree protocol (RSTP, which is a network protocol that ensures a loop-free topology for Ethernet networks), full Gigabit support on each port, 802.1x authentication, an active directory, and multicast address control. In addition, and according to further aspects of the embodiments, DNA devices support the ability to page one or more zones using a session initiation protocol (SIP) when the DNA microphone is available.

According to further aspects of the embodiments, DNA devices includes a single user interface that can be used to make global settings for all units on a shared network. Such global settings can include, but are not limited to These global or site-based settings shall include, but not be limited to, the following functionalities: streaming, announcing, bussing and logical groups, power, and audio (including, but not limited to dynamic range control, global equalization (EQ) curves, and speaker protection.

According to further aspects of the embodiments, DNA devices manages and controls streaming of data to and from itself. According to aspects of the embodiments, such management and control includes functions such as the ability to enable specific streaming services—all services that require login credentials can be set up to be disabled by default. Further, another control management function includes the ability to enable and select music library locations.

According to further aspects of the embodiments, DNA devices can manage announcing functions. Such announcement functions and features are enabled through the use of specific site settings and/or programming. The announcement functions and features include group configuration, which are collections of one or more output zones arranged into logical groups. According to aspects of the embodiments, at the highest level, all DNA devices can form a site group. Another function/feature of the announcement suite includes a library, which are tones, chimes, and dealer generated zone voice messaging that resides on a DNA device (e.g., soundbar 100) and which are accessible from one or more other DNA devices.

According to further aspects of the embodiments, DNA devices can work with a system scheduler, which is a separate application that provides the site-wide timing source to kickoff DNA programmed events or "scenes." Such scenes can include event logs, which are a system wide capture of important operational information, date and time stamps, event trigger sources, audio sources selected, broadcast groups, event duration, restoration of regular programming, and, flagging of any system faults.

According to further aspects of the embodiments, DNA devices can work with a proprietary cloud management service, such as the XiO Cloud as developed and managed by Crestron Electronics, Inc., of Rockleigh N.J. Other examples of external and/or proprietary networks include Intercom, which is a RAVA/SIP implementation for end-point to end-point voice communications within the site (e.g., the site being the two or more network connected DNA devices, such as soundbar 100; also a proprietary network communications protocol developed by Crestron Electronics, Inc.). According to aspects of the embodiments, such interconnections include such features/functionalities/characteristics as in that with smaller systems (e.g., those with less than 8 endpoints), native operation does not require a SIP server; n larger systems (e.g., those with more than 8 endpoints), an SIP server can be required; and in all systems, Dante can be used for audio-over-IP, as one non-limiting example.

According to further aspects of the embodiments, DNA devices further incorporates a pinpoint feature, which is a location finder for individuals that facilitates a "find me" function, as well as voice services, which is a hands-free voice activation feature of several system functions.

According to further aspects of the embodiments, DNA devices supports the following music services, among others: AirPlay 2, Amazon Music, Amazon Voice Services, Deezer, iHeartRadio, Napster, Roon, SiriusXM, SiriusXM Commercial, Sound Machine, Spotify Connect, and Tidal.

According to further aspects of the embodiments, DNA devices supports a built-in architecture to address routing of audio-over-IP signals. Such audio-over-IP can include, but are not limited to Dante, AES-67, or any other supported audio-over-Ethernet transport standard available now, or to be developed in the future. Such functionality/features, provides for soundbar 100 device with DNA (among other DNA enabled devices) to not require the use of a Dante controller to make Dante routes in DNA products (or require the use of any other audio-over-Ethernet/IP specific controllers for routing audio in DNA enabled devices).

According to aspects of the embodiments, through the use of a camera sensor, or infra-red detection device, among other sensory means, soundbar 100 can detect gestures in order to control various audio functions such as volume/mute, among others, and can control various devices within a conference room (opening and closing shades, raising and lowering light intensity, advancing slides within a presentation), among other devices.

According to aspects of the embodiments, one or more cameras and/or one or more microphones that are part of soundbar 100 can use either or both of specific voice characteristics and object recognition (color of clothing, etc.) to determine the number of specific persons within a conference room without the need to transmit personally identifiable information (P II) over the Internet or some other network, or through the Cloud.

The disclosed embodiments provide several different systems, software products, and methods related to a soundbar 100 device. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for enhancing security in use of a bi-directional communications device that includes one or more speakers and one or more microphones, to systems, methods, and modes for mounting such a device to a wall or other horizontal surface, to systems, methods, and modes for connecting and managing such a device through one or more proprietary networks including cloud based networks, and to systems, methods, and modes for interconnecting such devices through one or more proprietary networks so that management and control of such devices can occur.
Alternate Embodiments Alternate embodiments may be devised without departing from the spirit or the scope of the different aspects of the embodiments.

The invention claimed is:

1. A security enhancing device for a bi-directional communications device, comprising:
   an M-digit display;
   a processor;
   a security software application (security App) adapted to be stored in memory and executed by the processor;
   an N-digit random number generator adapted to periodically generate a new N-digit random number and transmit the same to the processor and the security App, and wherein the processor is further adapted to transmit the N-digit random number to the display to display the N-digit random number; and
   a wireless communications transceiver and antenna (wireless communications device) adapted to transmit and receive wireless communications to and from, respectively, one or more personal electronic devices that are adapted to wireless communicate using identical communications protocols as the wireless communications transceiver, and wherein
   the security App is adapted to receive and store the N-bit digit random number that changes periodically, and wherein
   the security App is adapted to generate an offer to join the meeting message that is transmitted by the wireless communications transceiver to the one or more personal electronic devices, and wherein
   the security App is adapted to receive a request to join the meeting message from a first personal electronic device, wherein the request to join the meeting message comprises a field within which a currently displayed N-digit random number can be entered into (request to join N-digit random number), and wherein
   the security App is further adapted to compare the received request to join N-digit random number to the stored N-digit random number, and if they match, then the security App provides a communication to the processor to allow bi-directional communications with the personal electronic device that transmitted the received N-digit random number, and wherein
   the security App is further adapted to disable displaying of the N-digit random number after a first predetermined period of time, and wherein
   the security App is further adapted to reject any requests to join the meeting after the first predetermined period of time.

2. The security enhancing device according to claim 1, wherein
   the security App is further adapted to communicate with meeting scheduling software through the bi-directional communications device, such that a meeting start time and a meeting end time can be obtained by the security App from the meeting scheduling software.

3. The security enhancing device according to claim 2, wherein
   the security App is further adapted to obtain permission from a meeting organizer after the first period of time has passed from the meeting start time prior to authorizing a new meeting participant.

4. The security enhancing device according to claim 2, wherein
   the security App is further adapted to disable communications between the one or more personal electronic devices and the bi-directional communication device at the meeting end time.

5. The security enhancing device according to claim 2, wherein
   the security App is further adapted to disable communications between the one or more personal electronic devices and the bi-directional communication device at a second predetermined period of time following the meeting end time.

6. The security enhancing device according to claim 1, further comprising:
   a passive infra red detection device, adapted to detect the presence of a person within a room where the meeting is being held.

7. The security enhancing device according to claim 6, wherein
   the security App is further adapted to generate and display a new N-digit random number upon the detection of the person following the first period of time.

8. The security enhancing device according to claim 1, wherein the bi-directional communications device comprises:

a soundbar device adapted to receive locally generated voice audio signals, broadcast remotely generated voice audio signals, and transmit the locally generated voice audio signal to a remote location where the remotely generated voice audio signals originate from.

9. A method for enhancing secure communications with a bi-directional communications device, the method comprising:

substantially continuously generating an N-digit random number by a random number generator, displaying the N-digit random number, and storing the N-digit random number;

transmitting an offer to join a meeting message to one or more personal electronic device using a wireless transceiver;

receiving a request to join the meeting message from a first personal electronic device, wherein the request to join the meeting message comprises a field within which a currently displayed N-digit random number can be entered into (request to join N-digit random number);

comparing the received request to join N-digit random number to the stored N-digit random number, and if the received request to join N-digit random number matches the stored N-digit random number, enabling wireless communications between the first personal electronic device and the bi-directional communications device;

disabling the display of the N-digit random number after a first predetermined period of time; and rejecting any further requests to join a meeting after the first predetermined period of time.

10. The method according to claim 9, wherein the step of generating an N-digit random number comprises:

generating a new N-digit random number periodically.

11. The method according to claim 9, further comprising:

operating a meeting scheduling software application in the bi-directional communications device; and obtaining a meeting start time and a meeting stop time.

12. The method according to claim 11, further comprising:

obtaining permission from a meeting organizer after the first period of time has passed from the meeting start time prior to authorizing a new meeting participant.

13. The method according to claim 11, further comprising:

disabling communications between the one or more personal electronic devices and the bi-directional communication device at the meeting end time.

14. The method according to claim 11, further comprising:

disabling communications between the one or more personal electronic devices and the bi-directional communication device at a second predetermined period of time following the meeting end time.

15. The method according to claim 9, further comprising:

detecting a presence of a person in a room within which the bi-directional communication device is located by using a passive infra-red detector.

16. The method according to claim 15, further comprising:

generating and displaying a new N-digit random number upon the detection of a person following the first period of time.

17. The method according to claim 9, wherein the bi-directional communications device comprises a soundbar device adapted to receive locally generated voice audio signals, broadcast remotely generated voice audio signals, and transmit the locally generated voice audio signal to a remote location where the remotely generated voice audio signals originate from.

* * * * *